United States Patent [19]

Moggia

[11] 4,177,512
[45] Dec. 4, 1979

[54] SOFT INPUT/OUTPUT AUTO POLL SYSTEM

[75] Inventor: Richard A. Moggia, Goleta, Calif.

[73] Assignee: Burroughs Corporation, Detroit, Mich.

[21] Appl. No.: 666,413

[22] Filed: Mar. 12, 1976

[51] Int. Cl.$^2$ ............................ G06F 3/04; G06F 13/00
[52] U.S. Cl. ..................................................... 364/200
[58] Field of Search .......................... 445/1; 340/172.5; 364/200 MS File, 900 MS File

[56] References Cited

U.S. PATENT DOCUMENTS

| | | | |
|---|---|---|---|
| 3,487,375 | 12/1969 | Macon et al. | 340/172.5 |
| 3,559,187 | 1/1971 | Figueroa et al. | 340/172.5 |
| 3,728,682 | 4/1973 | Helbig, Sr. | 340/172.5 |
| 3,728,693 | 4/1973 | Macker et al. | 340/172.5 |
| 3,913,074 | 10/1975 | Homberg et al. | 340/172.5 |
| 3,919,483 | 11/1975 | Gindi et al. | 340/172.5 X |

*Primary Examiner*—Melvin B. Chapnick
*Attorney, Agent, or Firm*—Nathan Cass; Kevin R. Peterson; Edward J. Feeney, Jr.

[57] ABSTRACT

A system for automatically polling peripherals associated with a computer system employing a program controlled interrupt mechanism wherein a number of programmatically established descriptors control input-/output operations. Two such descriptors, one dictating a read-from-peripheral operation and the other a write-to-peripheral operation, are linked in a loop such that under typical polling conditions the input/output control unit controls read-write accesses to the computer system memory independent of the computer central processor. Loop operation is accomplished by a linking address in each descriptor which is set to point to the other descriptor and by op code bits set to indicate a poll mode such that the I/O control typically performs a read-write-read-write sequence of operations. A poll message list is stored at a memory location indicated by the write descriptor, and the I/O control maintains the proper address in the poll message list to be accessed during each successive performance of the write operation. To assist in automatic linking between descriptors, the I/O control sets an "operation complete" condition, relieving the computer processor of this task.

3 Claims, 19 Drawing Figures

READ

```
BIT                                              BIT
 0                                                23
┌─┬─┬─┬─┬─┬─┬─┬─┬─┬─┬─┬─┬─┬─┬─┬─┬─┬─┬─┬─┬─┬─┬─┬─┐
│0│0│0│0│T│0│D│C│E│V│V│P│ │ │ │ │ │ │ │ │U│U│U│U│
└─┴─┴─┴─┴─┴─┴─┴─┴─┴─┴─┴─┴─┴─┴─┴─┴─┴─┴─┴─┴─┴─┴─┴─┘
```

VV = 00  NORMAL CHAINING
  01  CHAIN ONLY IF NEGATIVE RESPONSE IS RECEIVED
  10  CHAIN ONLY IF POSITIVE RESPONSE IS RECEIVED
  11  UNDEFINED

P = 0  DO NOT POLL
P = 1  POLL
UUUU = 0...15 ADAPTER NUMBER

WRITE

```
BIT                                              BIT
 0    3 4 5              11                       23
┌─┬─┬─┬─┬─┬─┬─┬─┬─┬─┬─┬─┬─┬─┬─┬─┬─┬─┬─┬─┬─┬─┬─┬─┐
│0│1│0│0│T│0│0│0│0│E│0│V│P│ │ │ │ │ │ │ │U│U│U│U│
└─┴─┴─┴─┴─┴─┴─┴─┴─┴─┴─┴─┴─┴─┴─┴─┴─┴─┴─┴─┴─┴─┴─┴─┘
```

P = 0  DO NOT POLL
P = 1  POLL; START WITH THE LOCATION SPECIFIED
       BY THE E ADDRESS

UUUU = 0...15 ADAPTER NUMBER

SOFT INPUT/OUTPUT AUTO POLL SYSTEM

BACKGROUND OF THE INVENTION

Broadly, the invention disclosed herein pertains to a method and apparatus for controlling input/output transfers between a computer and a number of peripheral terminal units. More particularly the subject invention relates to such a method and apparatus for use in conjunction with apparatus of a program controlled interrupt system as disclosed in U.S. Pat. No. 3,728,693 issued to John Arthur Macker and William Francis Keenan on April 17, 1973 and assigned to the present assignee. As disclosed in that patent, I/O operations may be accomplished under control of a number of programmatically established descriptors stored in a memory system cooperating with a computer processor. The ability to programmatically link a number of descriptors provides the ability to chain input/output operations, and thereby avoid processor intervention during each I/O operation. This method of I/O control proves to have drawbacks when it is desired to rapidly poll peripherals. Particularly, the requirement that the processor intervene after each I/O operation proves particularly time-consuming and wasteful of processor power.

SUMMARY OF THE INVENTION

It is, therefore, an object of the invention to improve input/output operations of a computer system.

It is a further object of the invention to increase the efficiency of the input/output mechanism of a computer system employing a descriptor based, programmatically controlled interrupt discipline.

It is yet another object of the invention to provide a technique within such a discipline for automatically accomplishing polling operations between a computer memory and a number of peripherals with a minimum of processor intervention.

These and other objects and advantages of the invention are achieved by providing a write descriptor and a read descriptor which contain information causing the I/O control to link automatically between read and write operations under typical input/output conditions. The requirement that the processor intervene between each of these links is eliminated by assigning this task to the I/O control. Polling is facilitated by storing a list of poll messages at an address indicated in the write descriptor and after each performance of the write descriptor storing the address within the list to be accessed when the I/O control subsequently links back to the write descriptor.

BRIEF DESCRIPTION OF THE DRAWINGS

A manner of implementing the just summarized invention will now be discussed in detail in conjunction with the drawings, of which:

FIGS. 7A-7K are flow diagrams illustrating the operation of the input/output control apparatus of FIG. 6 in executing the descriptor arrangement of FIG. 3.

DETAILED DESCRIPTION OF THE PREFERRED EMBODIMENT

Figure 1:
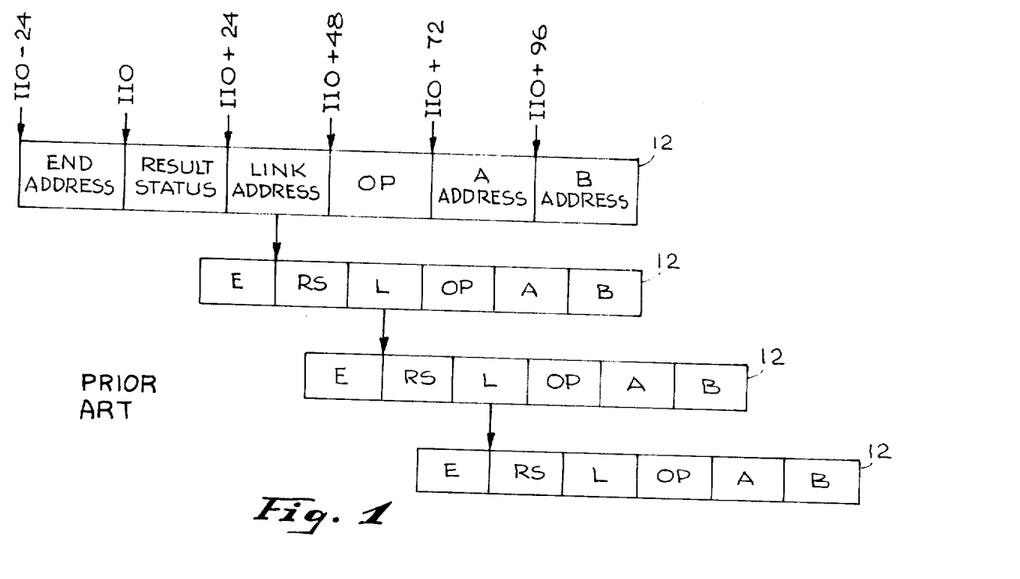
FIG. 1 illustrates chaining of descriptors as in the prior art.

While a more detailed understanding of a descriptor based input/output system may be gained by examination of U.S. Pat. No. 3,728,693, some discussion of the concepts taught in that patent will facilitate appreciation of the subject invention. The I/O system of U.S. Pat. No. 3,728,693, which patent is incorporated by reference herein, utilizes descriptors stored in a system memory associated with a computer processor such as that disclosed in U.S. Pat. No. 3,739,352 issued to Roger Packard on June 12, 1973. Several such descriptors 12 are illustrated in FIG. 1. A basic understanding of the nature and use of descriptors may be obtained from U.S. Pat. No. 3,222,649 issued Dec. 7, 1965.

Each descriptor 12 contains a final address field E, a result status field RS, a link address field L, an op code field, a beginning address field A, and an ending address field B.

The op code field specifies the nature of the input-/output operation to be performed, such as reading information from a peripheral device to system memory or writing information into a peripheral device from the system memory. The beginning address field A and the ending address field B define the beginning address and the ending address of the buffer area in memory set aside for use in the execution of the input/output operation defined by the op code. The final address field E stores the final address location in memory at the completion of the input/output operation. The result status field RS indicates the results of the performance of the op code. The most significant bit in the result status field is referred to as the operation complete (OC) bit. When a descriptor is executed, the operation complete bit is set to "1", and the input/output control unit will not execute that descriptor again until the operation complete bit is set to "0". In the prior art, the OC bit is set to "0" by the software of the system after it has been determined that the buffer area in memory defined by the beginning address A and ending address B is available for an input/output operation. Finally, the link address field L contains an address pointing to the result status field of the next descriptor which is to be executed.

Figure 2:
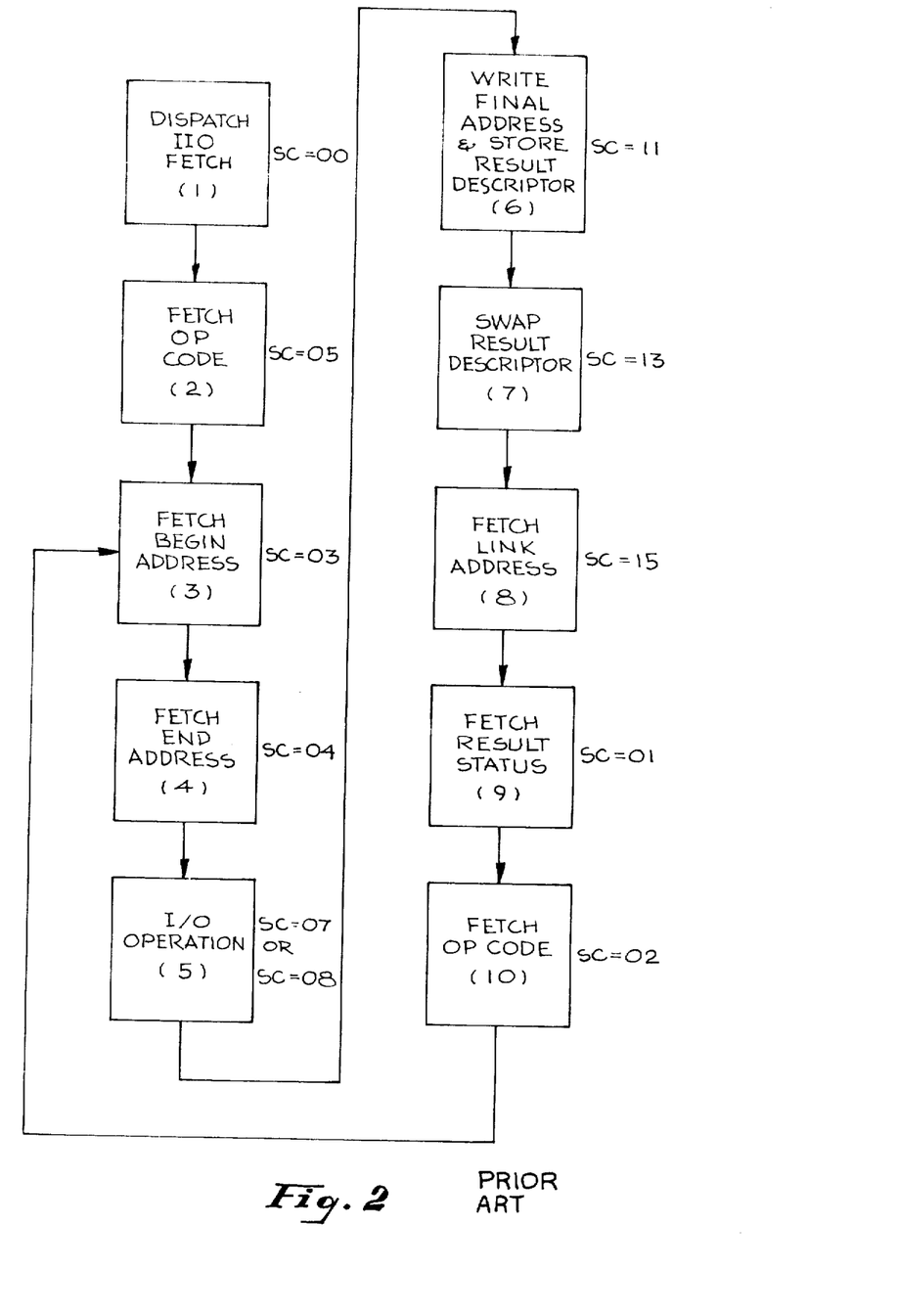
FIG. 2 illustrates the general memory flow executed by the I/O control in the preferred embodiment of the invention.

The general memory cycle control flow used by the input/output control of the subject invention in executing a descriptor is the same as that described in U.S. Pat. No. 3,728,693 and illustrated in FIG. 2. The sequential ordering of each control flow step 1-10 of FIG. 2 is accomplished by means of a sequence counter and a micro-sequence counter. Each step 1-10 corresponds to a different sequence counter count SC, and operations within each step are controlled by the micro-sequence count.

To briefly summarize the flow of FIG. 2, an initial address IIO of the first descriptor in memory is fetched in a dispatch operation. This address is then incremented to obtain that of the op code, for example, IIO+48 as illustrated in FIG. 1. The op code is then fetched to the I/O control. In the next sequence step, the op code address is incremented to obtain the beginning address A, which is then fetched to the I/O control. In the fourth step, the address of the beginning address field A is incremented to obtain the address of the ending address field B, which is then also fetched by the I/O control. With the op code, the beginning address A, and the ending address B, the I/O control executes the operation indicated by the op code. After this execution, in the sixth step of the flow, the final address developed during the I/O operation is stored in the final address field E of the result descriptor in memory. For example, in FIG. 1, the final address would be stored at location IIO+24. At the same time, the result descriptor is assembled in the I/O control from information supplied by the terminal unit. In the next step, the assembled result descriptor is "swapped" or transferred back to the result status field in memory, for example, by addressing location IIO in FIG. 1. During the next step 8 an incremented form of the IIO address is used to fetch the link address L to the input/output control unit provided that no error conditions were reported in the result descriptor. This address is then used to fetch the result status field of a second result descriptor. The result status field of the second descriptor is then tested by the I/O control unit as to the status of the operation completion bit, and if the operation completion bit is "0", the op code of the second descriptor will be fetched as indicated in step 10. If the operation completed bit is "1", the I/O control will pause 8 milliseconds, then fetch the result status field of the second descriptor and test the operation completed bit. This process will repeat until the operation completed bit is set to "0". The flow then returns to step 3, where the beginning address of the second descriptor is fetched.

In the preferred embodiment of the subject invention a particular functional interrelationship is established between two descriptors such as those discussed thus far. The operations and address indicated by the various fields of the two descriptors are given specially defined functions and the input/output memory cycle control scheme is modified to accommodate these functions. Accordingly, the same form of embodiment may be employed for the present invention as that disclosed in the aforementioned U.S. Pat. No. 3,728,693 with the modifications set forth in FIGS. 3–6 and 8–9, the resulting modified operation of the preferred embodiment of the present invention then being as set forth by the flow charts of FIGS. 7A–7K. These provisions have as their combined object the provision of a rapid and efficient scheme for relaying messages between a number of peripheral units and the computer system memory, whereby to provide automatic polling of peripherals without processor intervention within the framework of the system disclosed in the aforementioned U.S. Pat. No. 3,728,693. The interrelationship and structure of the particular descriptors involved in the preferred embodiment of the invention may be seen in FIGS. 3 and 4.

Figure 3:
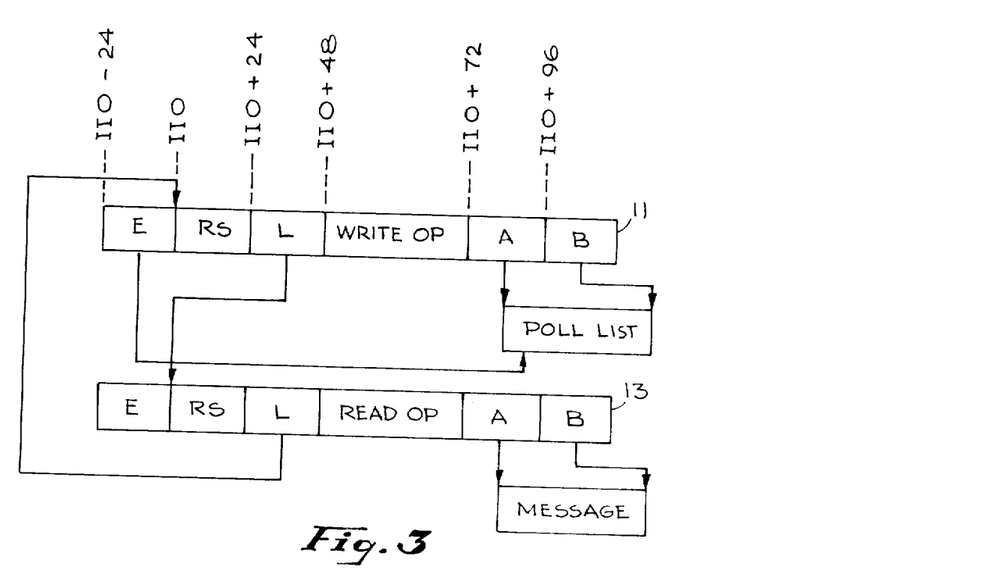
FIG. 3 illustrates the structure and interrelationship of descriptors arranged to accomplish automatic polling in the preferred embodiment of the invention.

As is there shown, a first descriptor 11 containing a write operator and a second descriptor 13 containing a read operator are chained in a loop by their respective linking addresses. In other words, the linking address of the write descriptor 11 points to the result status field of the read descriptor 13 and the linking address of the read descriptor 13 points back to the result status field of the write descriptor 11. In addition, the beginning address A and ending address B of the write descriptor 11 delimit the location in system memory of a poll list. The poll list includes a number of poll messages and is shown in more detail in FIG. 4. The final address field of the write descriptor 11 contains an address pointing to the next message in the poll list to be sent. The manner in which this address is established will be discussed in greater detail below. Lastly, the beginning address field A and the ending address field B of the read operator 13 delimit the location in system memory in which a message read from a terminal unit is to be stored.

Figure 4:
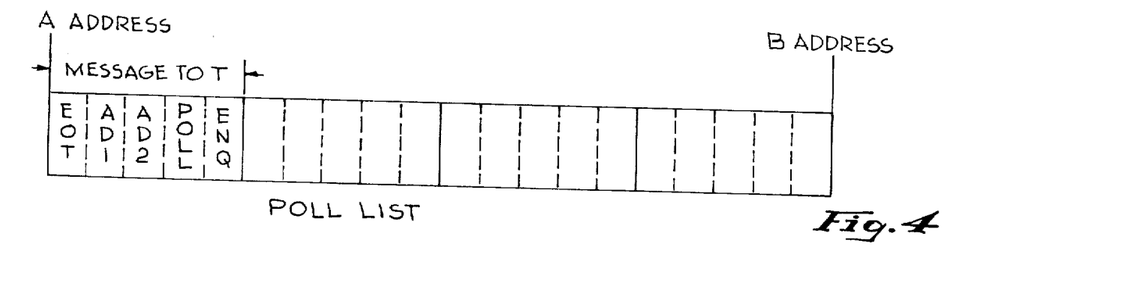
FIG. 4 illustrates the structure of a poll list of the write descriptor of FIG. 3.

The poll list for the write operator 11 is shown in more detail in FIG. 4. It includes a number of poll messages each made up of 5 eight-bit characters. These characters are an EOT code which is used by a terminal to prepare the terminal for polling, AD1 and AD2, a two character address used to address a terminal in the polling mode, a POL code which indicates to the terminal that it is being polled—i.e. asked if it has a message to transmit, and finally an ENQ code which indicates the end of the poll message. During each performance of the write operator of the first descriptor 11 a character is sent to a terminal unit by the I/O control.

Figure 5:
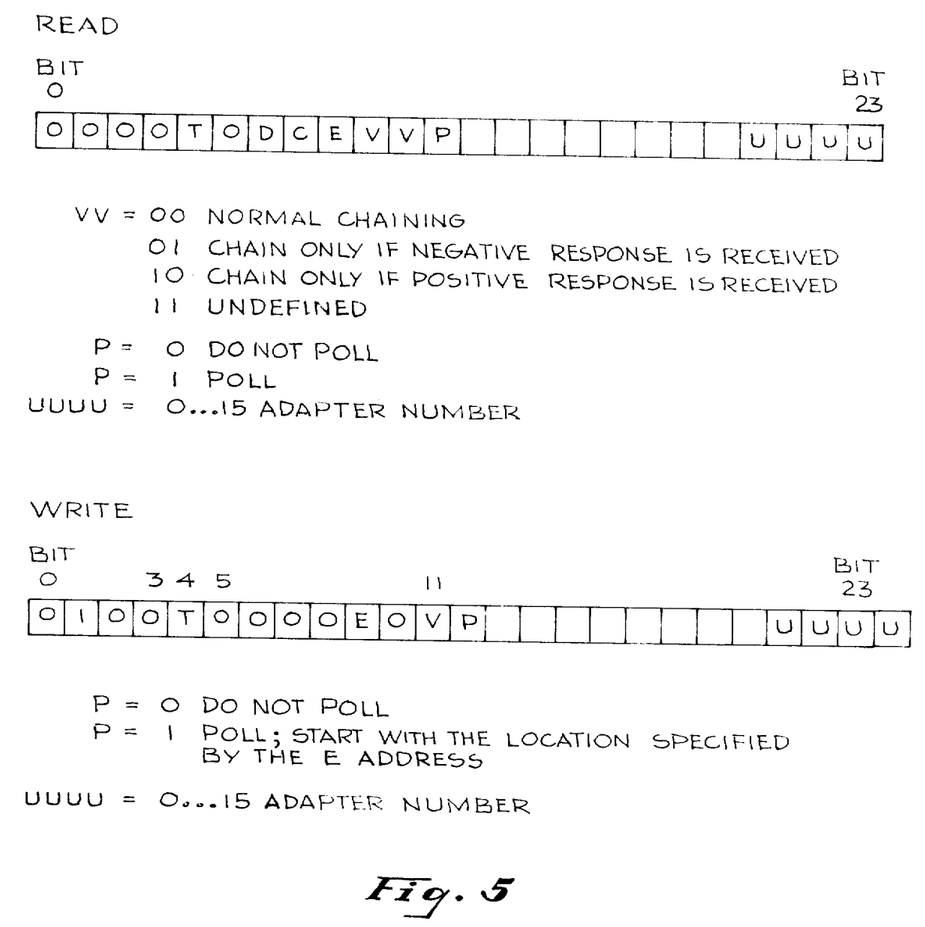
FIG. 5 illustrates op code format of the descriptors of FIG. 3.

The operators in the descriptors 11, 13 are modified by the addition of variant bits to institute the auto poll operation. The write operator, which controls writing from the poll list in memory to a terminal includes a poll variant bit P as shown in FIG. 5. When this bit is set, apparatus in the I/O control will set the operation complete bit in the result status field RS to "0", causing an automatic link to the read descriptor 13 without processor intervention. To continue auto poll, the read operator has a poll variant bit P and a link-on negative response bit VV set as shown in FIG. 5. With these bits set, the operation complete bit OC in the result status field of the read descriptor 13 would automatically be set to "0" if a negative response, indicating no reply to the poll, was received from the terminal unit to which the poll message was previously sent during performance of the write descriptor 11. Typically, the terminal is not ready to transmit a message because polling is conducted very rapidly. By causing an automatic link back to the write operation, rapid automatic performance of the polling function is accomplished. In the event that a message is to be transmitted from a terminal, however, an interrupt will be generated to allow for operator monitoring of the message. Absent an interrupt, an automatic read-write-read-write sequence of operations is set up between the two descriptors 11, 13.

In performance of this read-write-read-write sequence, each of the descriptors illustrated in FIG. 3 is executed according to the flow previously discussed in connection with FIG. 2 (which corresponds to that disclosed in the aforementioned U.S. Pat. No. 3,728,693), subject to two exceptions. The first is that a modification is introduced into the fetching of the begin address A in order to return to the final address field E. The second is that when the result descriptor RS is swapped, logic is provided to automatically set the operation complete bit OC to "0". These two features will be discussed in detail below with reference to FIG. 6, a schematic diagram of the I/O control unit which has preferably the same basic construction as the corresponding I/O control unit illustrated in FIGS. 9, 9A and 10 of the aforementioned U.S. Pat. No. 3,728,693 which may accordingly be referred to for further details not covered by the description of FIG. 6 of the present invention which will now be provided.

Figure 6:
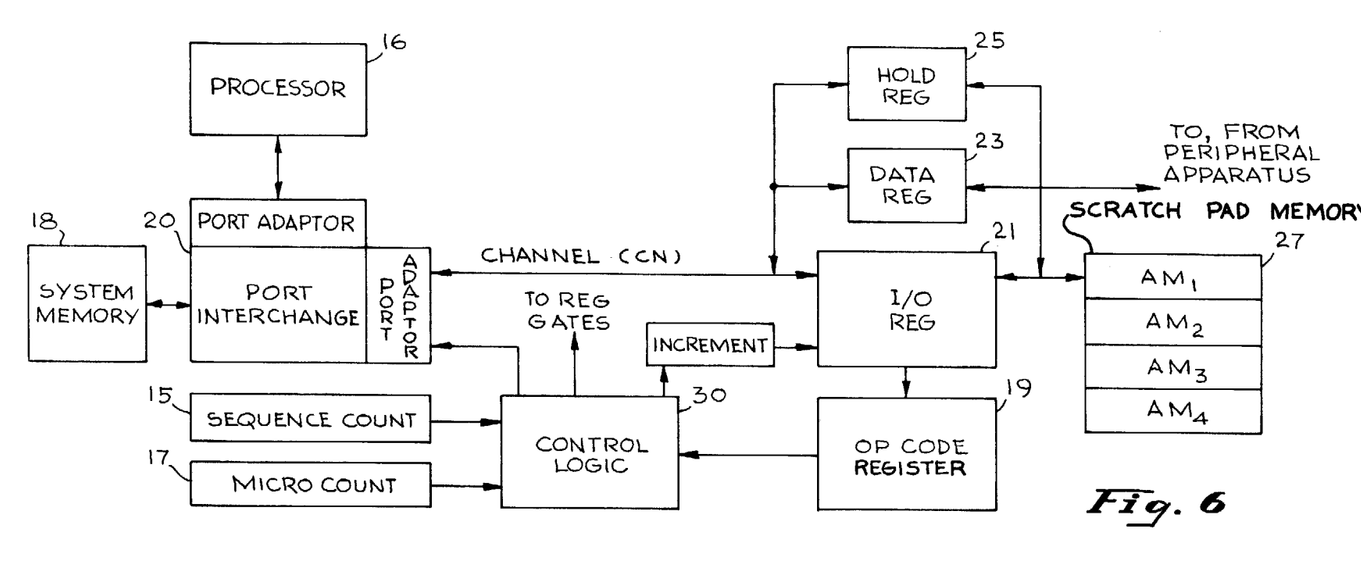
FIG. 6 is a block diagram illustrating the I/O control apparatus of the subject invention and its relation to the computer system memory.

The I/O control unit includes a sequence counter 15, which orders each step in the flow of memory exchanges and a micro-sequence counter 17, which provides substates for each count of the sequence counter 15. The I/O control unit further includes a number of registers for storing 24 bit addresses of descriptor fields and the descriptor fields themselves once they have been addressed during a memory cycle. These storage areas include an input/output register 21, an op code register 19 for storing op code information, and a scratch pad memory 27 including 4 storage cells $AM_1$, $AM_2$, $AM_3$ and $AM_4$. Additionally two other registers, a holding register 25 and a data register 23, are added to provide temporary storage during a memory cycle. The proper gating of information between these registers is controlled by memory sequence control logic 30, which activates appropriate gates included in the paths between each of the registers 19, 21, 23, 25, 27, in response to the state counts of the sequence counter 15 and the micro-sequence counter 17. The control logic 30 also controls the proper incrementing of addresses in the I/O register and provides control signals to the port interchange.

The operation of the input/output control unit of FIG. 6 will now be discussed in detail as it relates to execution of the auto poll descriptor arrangement shown in FIG. 3. Substates in these flows are illustrated in FIGS. 7A-7K. It is to be understood that the flows in these figures illustrate the operation of the control logic 30 in FIG. 6 and are generally of the same basic type as the flows shown in FIGS. 11-21 of the aforementioned U.S. Pat. No. 3,728,693 used for illustrating the operation of the control logic in the input/output control thereof (see U.S. Pat. No. 3,728,693, column 14, lines 22-25). Also, similarly to this aforementioned patent, the states of sequence counter 15 in FIG. 6 of the present invention are designated by SC=00, SC=01, SC=02, etc., while the states of micro-counter 17 in FIG. 6 are designated by MCC0, MCC1, MCC2, etc. Signals representative of these states are provided with like designations in FIGS. 8 and 9. Also, for greater ease of understanding, the flow charts of the present invention include word descriptions summarizing the operations occurring during each micro-count block. During the first step in the flow, identified by system counter state SC00 (FIG. 7A) the address IIO is dispatched by the processor 16 from the system memory 18 to the input/output register 21 of the I/O control. The input/output register contents are then incremented by 48 to yield the address IIO+48 of the write operator. This address IIO+48 is then gated to the holding register 25 for temporary storage.

During the second step in the sequence count indicated by sequence counter state SC05, (FIG. 7B), the holding register's contents are gated back to the input/output register 21 and incremented by 24 to yield IIO+72, the beginning address A. The holding register 25 retains the value IIO+48, which is then gated onto the channel to system memory in conjunction with a field length indication of 24 from the control logic 30. In the next substate, the contents IIO+72 of the input/output register 21 are transferred to the holding register 25 and the op code is transferred into the input/output register over the channel. The poll variant bit is then entered into an op code register. The contents of the holding register IIO+72 are then gated back to the input/output register and in the next substate to the $AM_4$ location in a scratch pad memory. Lastly, the IOR register contents IIO+72 are decremented by 96 to yield the address IIO−24 which is then stored in the scratch pad memory location $AM_1$.

Figures 7A, 7B:
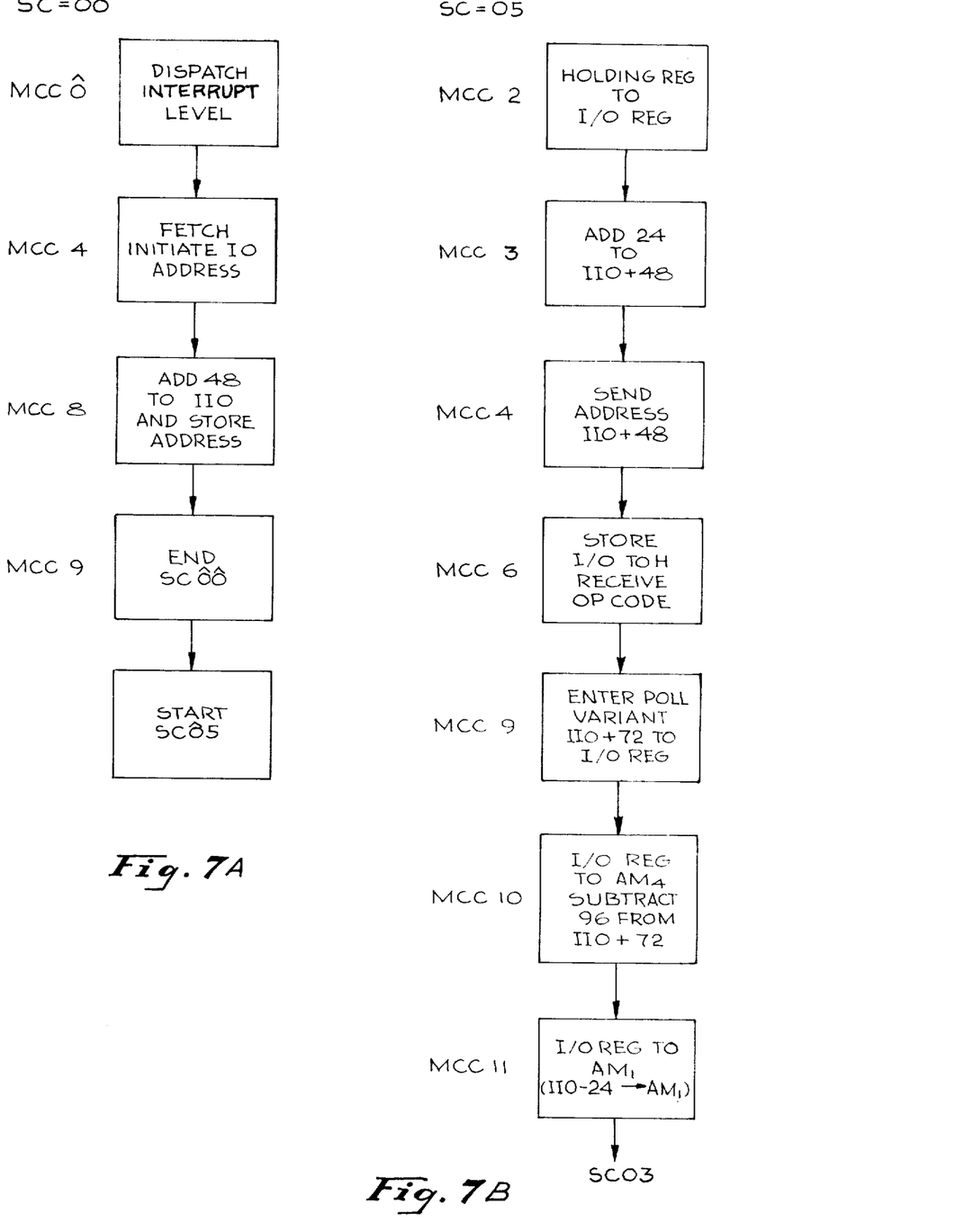
Figure 7C:
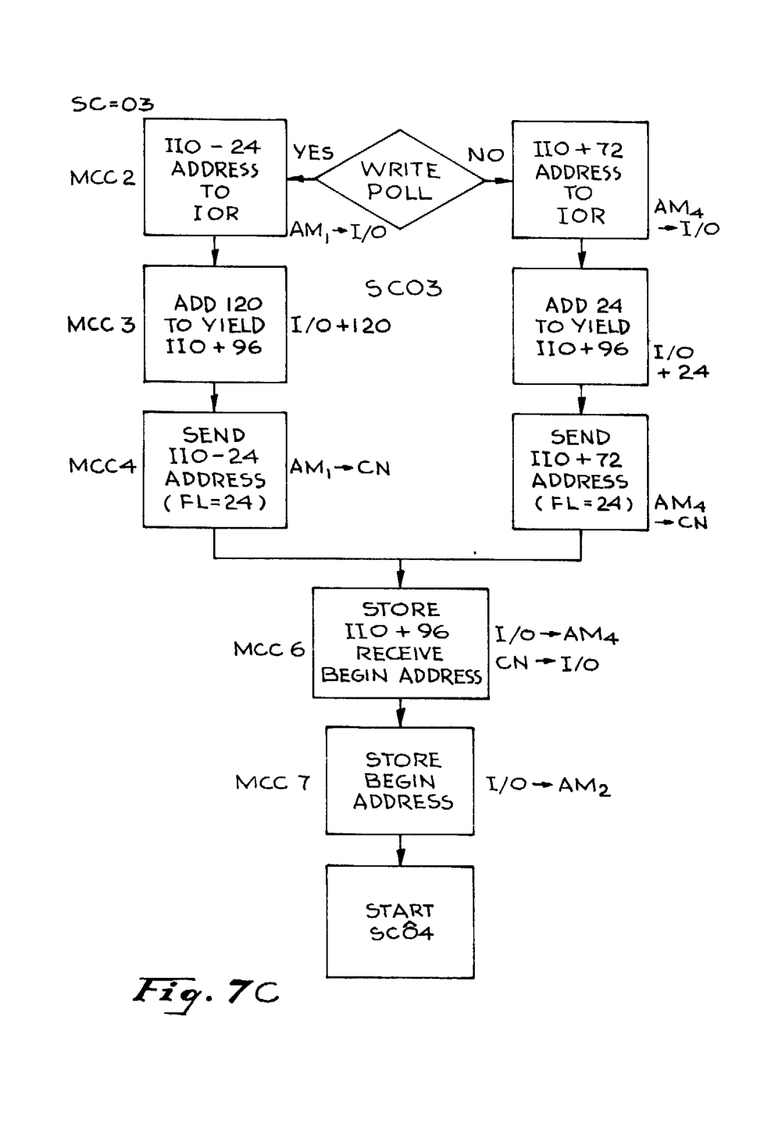
Figure 8:
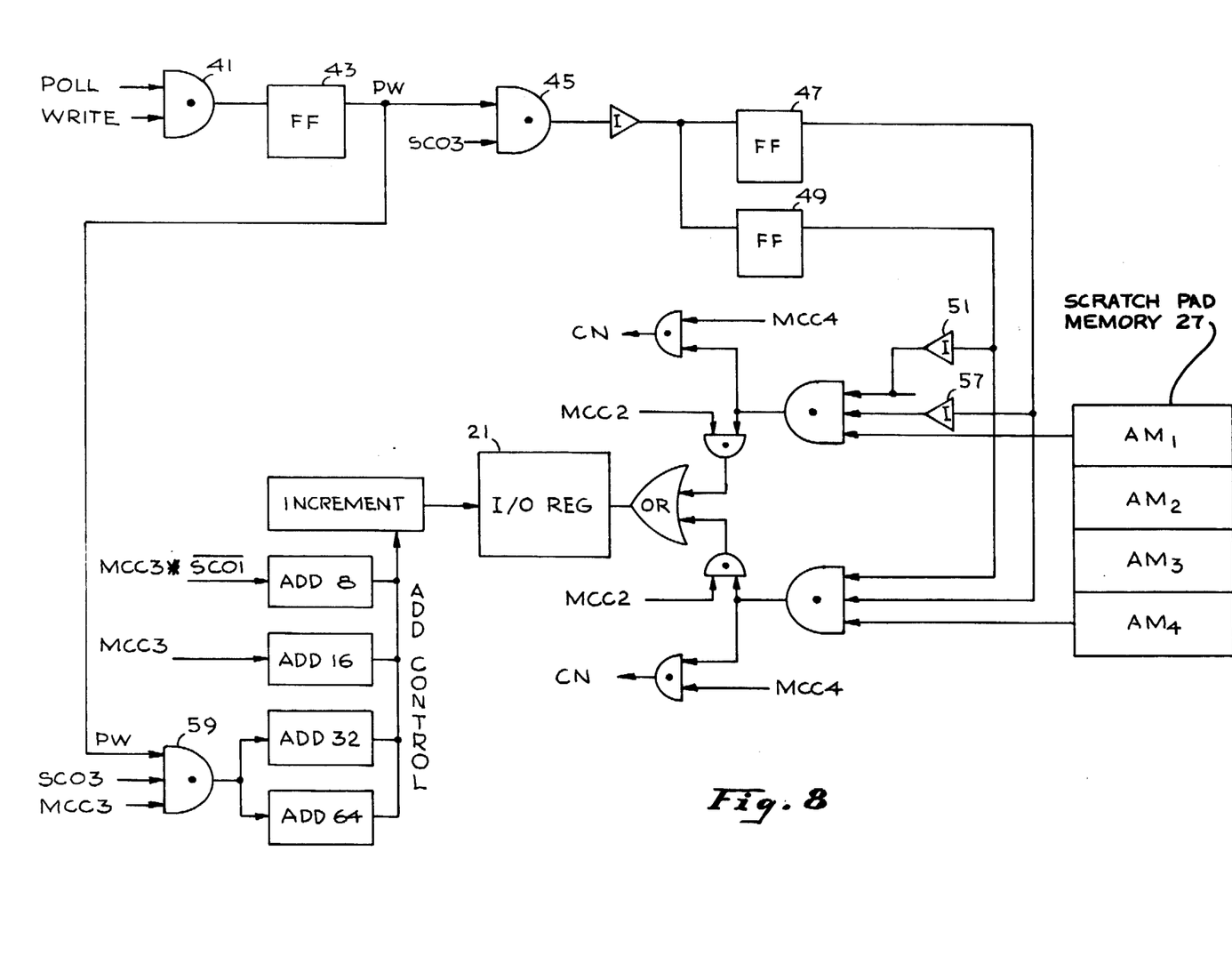
FIG. 8 illustrates logic for accomplishing address selection according to the flow of FIG. 7C.

The third or fetch begin address step SC03 is modified to accommodate auto poll operation as illustrated in the flow of FIG. 7C. Typically, the begin address is fetched at the address IIO+72. However, in the case of an auto poll write where the poll variant bit in the write op code is set, the begin address is fetched at location IIO−24 to enable accessing the next character in the poll list. This action is indicated under sequence counter state SC03 and micro-sequence counter state MCC2. In the next step MCC3, the address IIO+96 of the ending address B is obtained by incrementation. In the next step MCC4, the correct address is sent onto the channel line CN. The address IIO+96 is then stored in scratch pad location $AM_4$, and the begin address is received and stored in scratch pad location $AM_2$. The logic circuitry provided in the control logic 30 in FIG. 6 for implementing the begin address selection is shown in FIG. 8. When both a poll variant bit and a write operation are indicated, an AND gate 41 sets a flip-flop 43 to the value PW. Upon a coincidence of this signal PW and the counter state SC03 as determined by AND gate 45, two flip-flops 47, 49 which control gating from the scratch pad cells are reset to "0". These outputs then disable output from scratch pad cell $AM_4$ while they enable the output of the IIO−24 address stored in scratch pad cell $AM_1$. Similarly, on the coincidence of the PW signal and the counter states SC03 and MCC3 at an AND gate 59, ADD-32 and ADD-64 flip-flops are set in addition to ADD-16 and ADD-8 flip-flops. These flip-flops then order the addition of 120 to the I/O register to obtain the IIO+96 address. It may be seen that absent the PW signal, the value 24 would be added to the I/O register, which would also then contain the IIO+72 value transferred from the scratch pad cell $AM_4$. This value IIO+72 would then be also incremented to IIO+96.

Figure 7D:
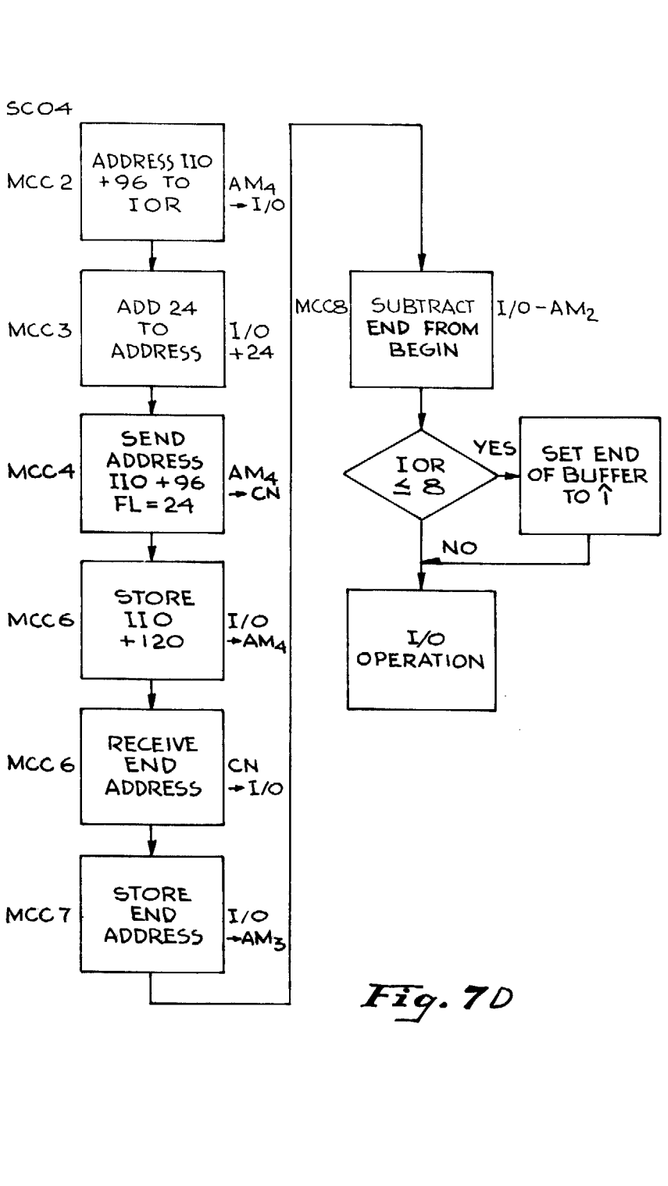
Figure 7E:
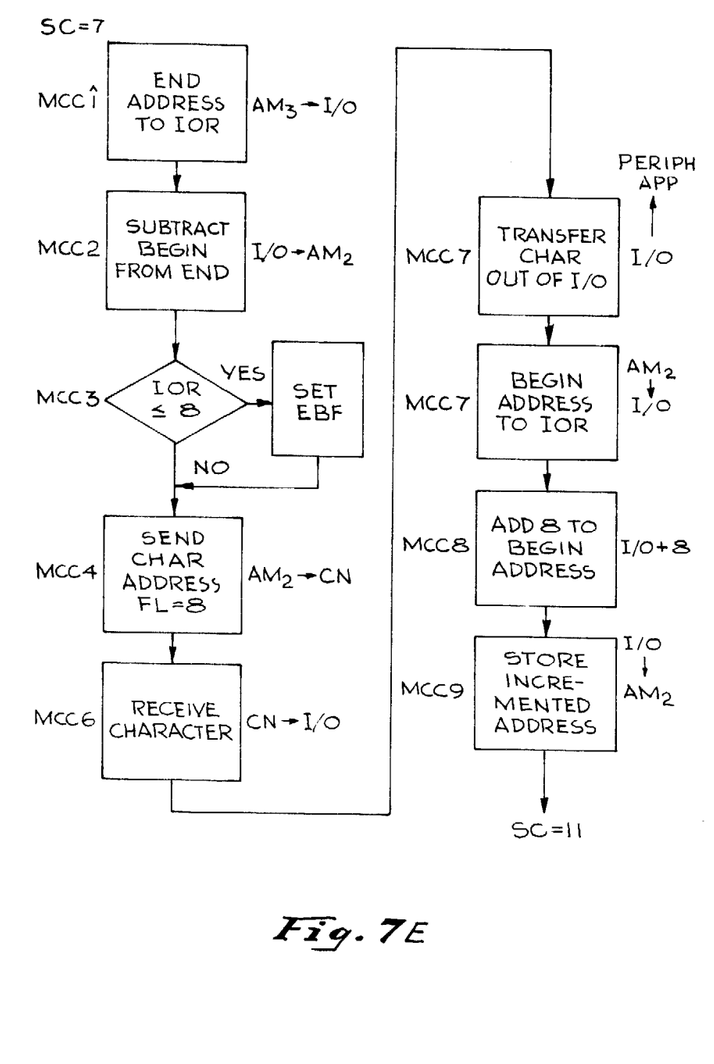
Figure 7F:
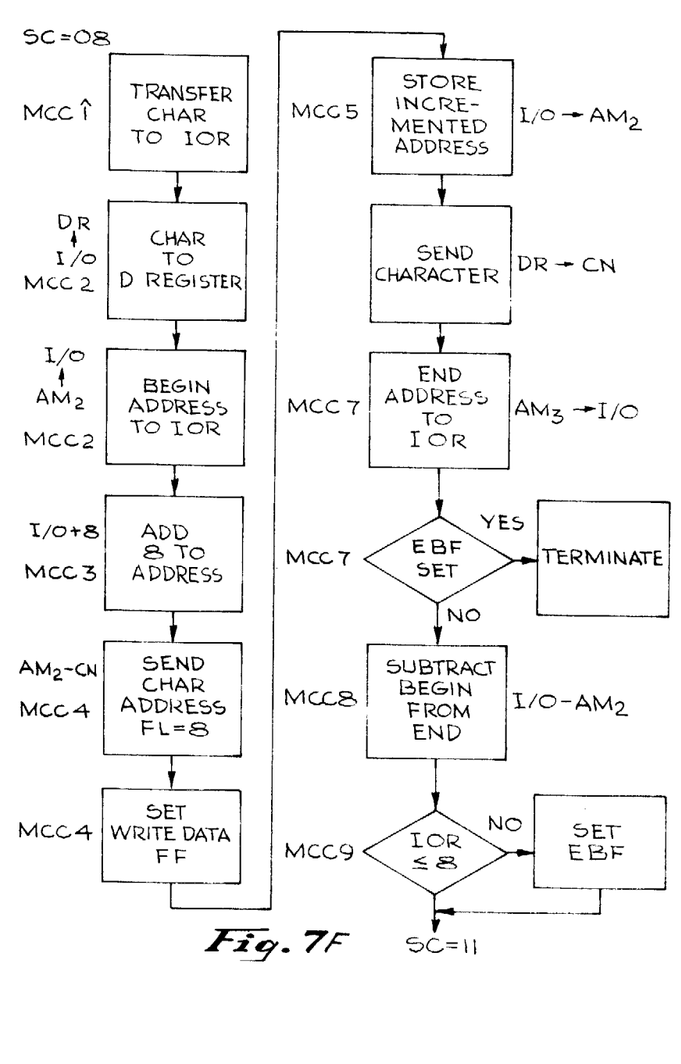
Figure 7G:
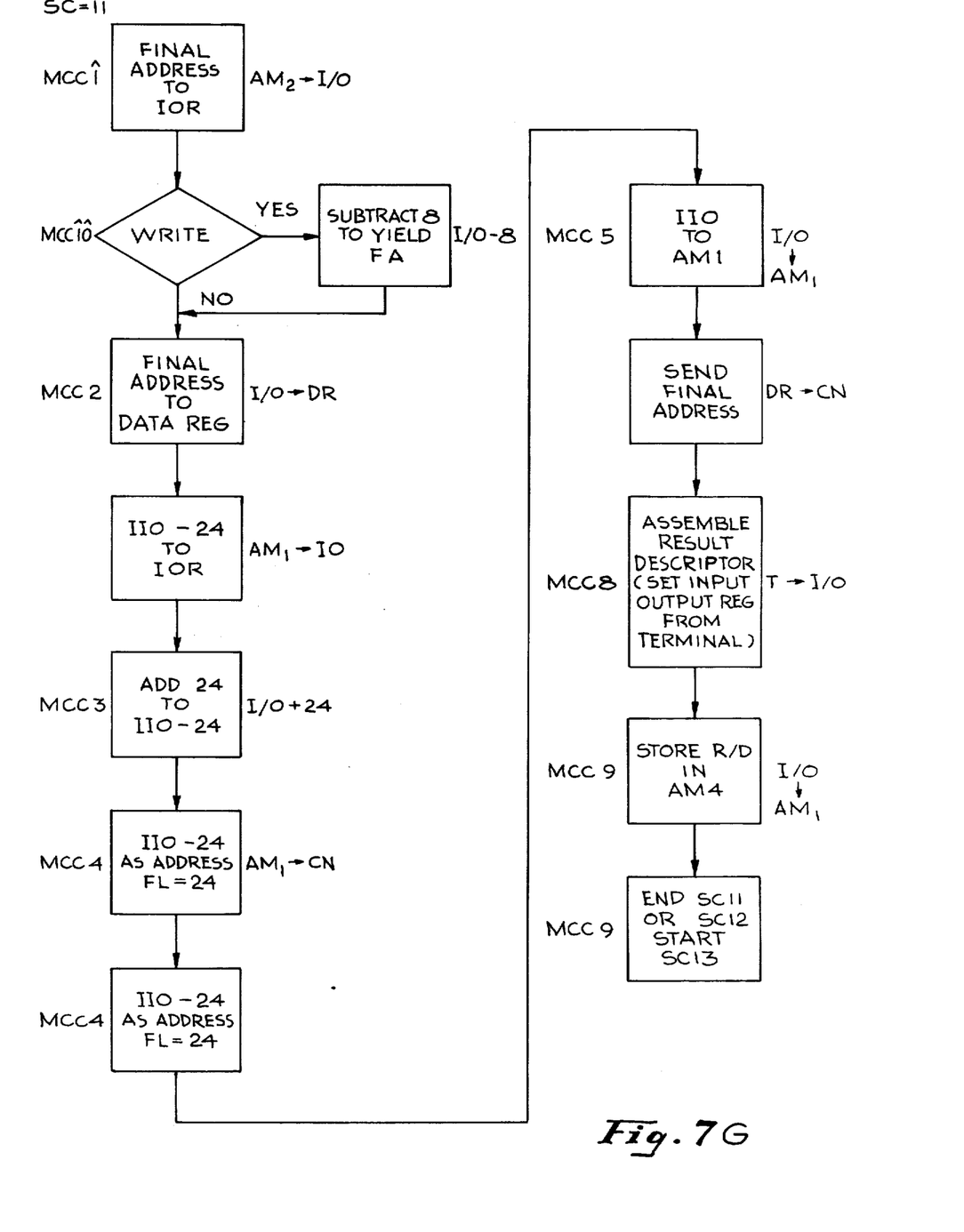

After the begin address A is fetched, the end address B is fetched as indicated in FIG. 7D during state counter sequence SC04. This addressing is accomplished by presenting the IIO+96 address to the memory and storing the received end address into scratch pad cell $AM_3$. After this transfer the begin address is subtracted from the end address to ascertain whether the A to B buffer has been exhausted. This is accomplished by subtracting the contents of the $AM_2$ register from the contents of the input/output register which still holds the end address B. The A to B buffer is exhausted when the results of the subtraction yield a value of 8 or less.

In step 5, (FIG. 7E), the I/O operation indicated by the op code is executed. In a write operation, a character of 8-bits or field length 8 is addressed in the memory by presenting the address stored in memory location $AM_2$. The character is then received by the input/output register through the channel CN and is then transferred out of the I/O control to other apparatus. The begin address is then transferred from $AM_2$ to the input/output register where it is incremented by 8-bits in preparation for the next memory fetch and then returned to the scratch pad location $AM_2$. If a read operation (FIG. 7F) is dictated, the character is received by the input/output register and transferred to the data register. The begin address is then transferred to the input/output register from scratch pad location $AM_2$ where it is incremented by 8-bits. The unincremented character address is then transferred on to the channel CN from scratch pad cell $AM_2$ and the incremented address is subsequently transferred into $AM_2$ from the input/output register. Finally the character is sent on to the channel from the data register and is stored by the memory according to the character address previously transferred.

After the I/O operation, the final address is written and the result descriptor stored, as indicated in step 6 of the flow diagram, (FIG. 7G), sequence counter states SC-11. The final address is stored in the scratch pad cell $AM_2$, which from the above discussion is the beginning address incremented by 8-bits. In the case of a write operation, a test is made after the begin address is incremented for the next fetch to determine if a peripheral is signaling it has terminated operation. If termination is indicated, the next fetch is not performed, and therefore 8-bits is subtracted from the input/output register contents to yield the correct final address. In the case of the read operation, the address transferred into the input-/output register from $AM_2$ is unaltered. The address IIO−24 is then transferred to the input/output register from the scratch pad cell $AM_1$ and the final address is transferred to the data register from the input/output register. The input/output register contents are then incremented by 24 to yield the IIO address and during the next micro state, the final address is transferred to memory from the D register using the IIO−24 address in the scratch pad cell $AM_1$. Finally, the result status message is transferred into the intput/output register. The result status information is then stored in the scratch pad cell $AM_4$.

The next sequence entered is that indicated by sequence counter state SC−13, wherein the result descriptor is swapped with memory. It is in this state that the operation complete bit is automatically set by the apparatus of the preferred embodiment to cause automatic chaining. This operation is indicated in detail in the flow diagram of FIG. 7H. As there indicated, the result descriptor is transferred into the input/output register and from there to the data register. The address IIO is transferred into the input/output register. Normally, this result descriptor field would then be placed into memory at the indicated address. However, if auto poll is indicated by the poll variants, a one-bit field length is indicated to the memory and the transfer from the D register is inhibited. In this manner a "0" bit is written into the high order bit location, i.e., the operation complete bit location, of the result status field of the descriptor. Resetting of this bit by the processor is thereby avoided.

Figure 9:
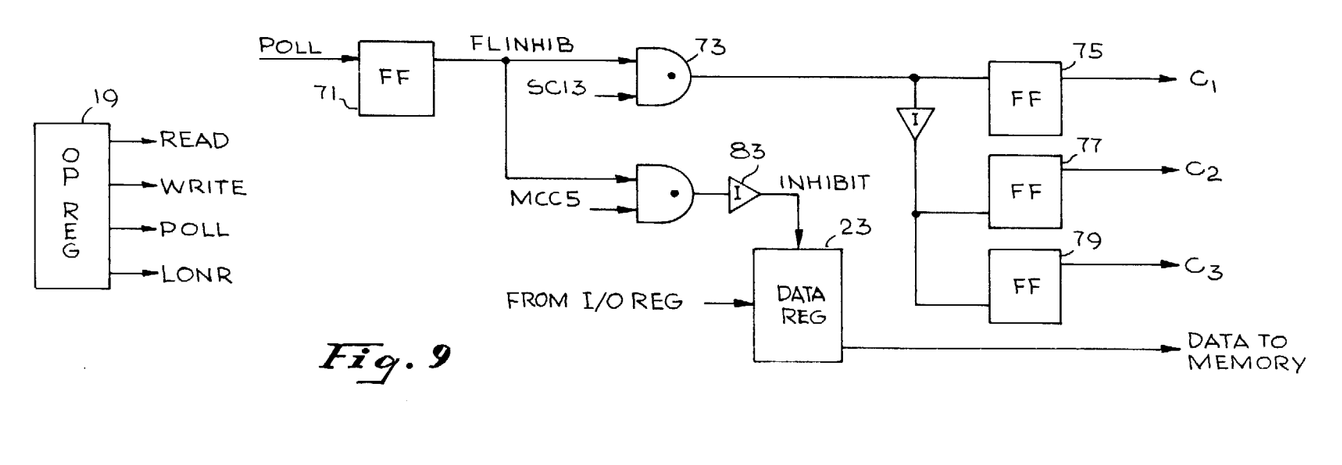
FIG. 9 illustrates logic for automatically writing an operation complete bit in accordance with flow step FIG. 7H.

Logic for accomplishing the automatic set of the operation complete bit is indicated in FIG. 9. When the poll variants are present, a flip-flop 71 is set producing a field length inhibit output signal FLINHIB. Coincidence of this signal and sequence state SC13 as determined by AND gate 73 sets the output of 3 flip-flops 75, 77, 79 to 1, 0 and 0 respectively. These flip-flop outputs $C_1$, $C_2$, $C_3$ are control lines which indicate to the memory 18 in FIG. 6 the field length of data to be transferred, either 1, 8 or 24 bits. The code 100 indicates a 1-bit transfer. The field length inhibit signal also acts at micro sequence counter time MCC5 to inhibit the data register 23 from outputting to the memory.

Figure 7H:
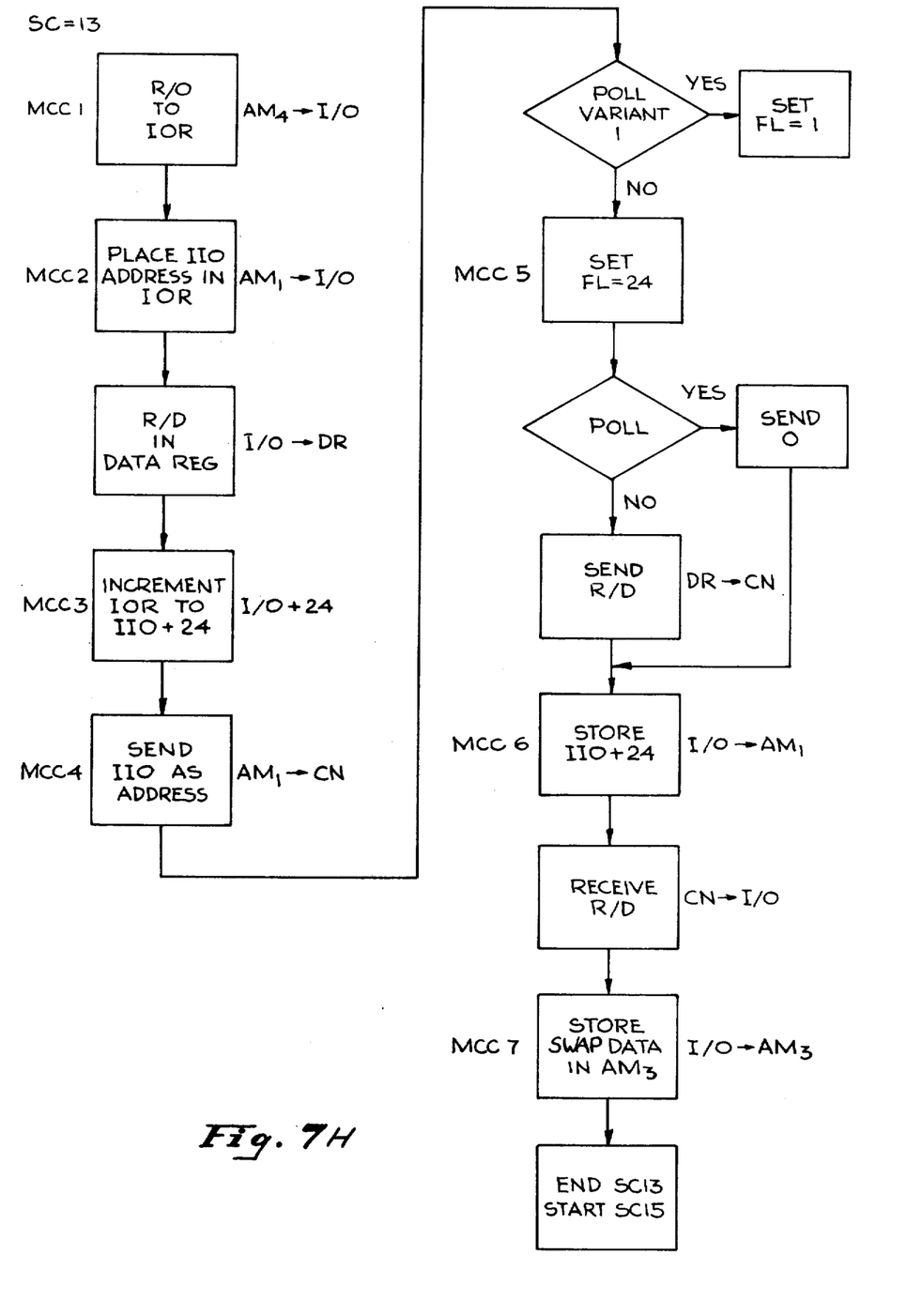
Figure 7I:
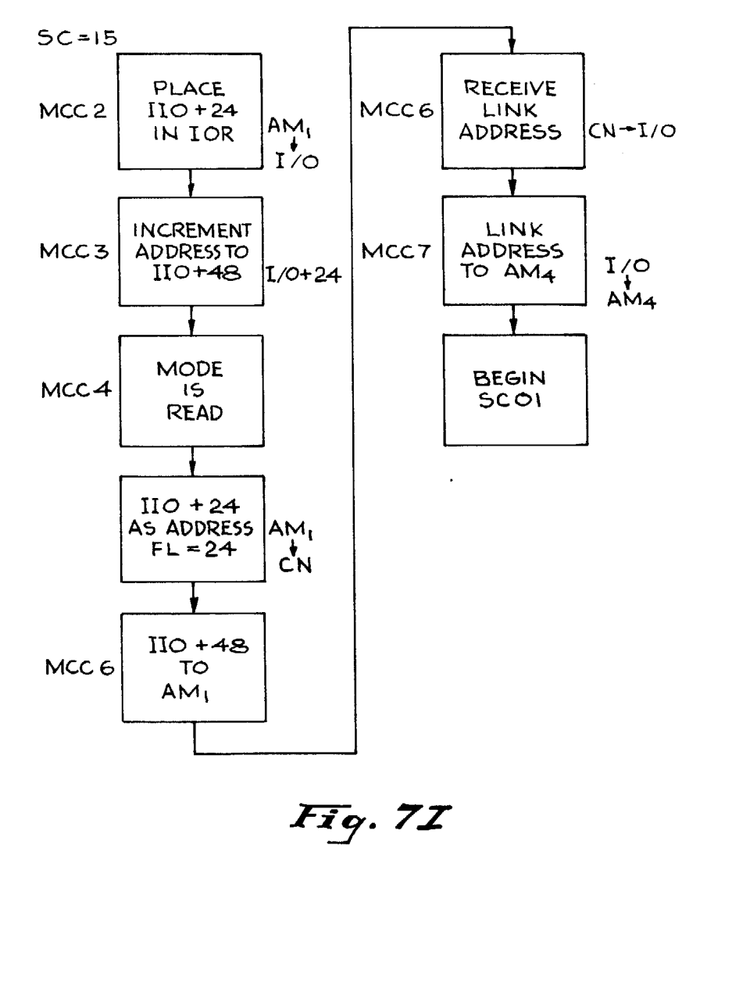
Figure 7J:
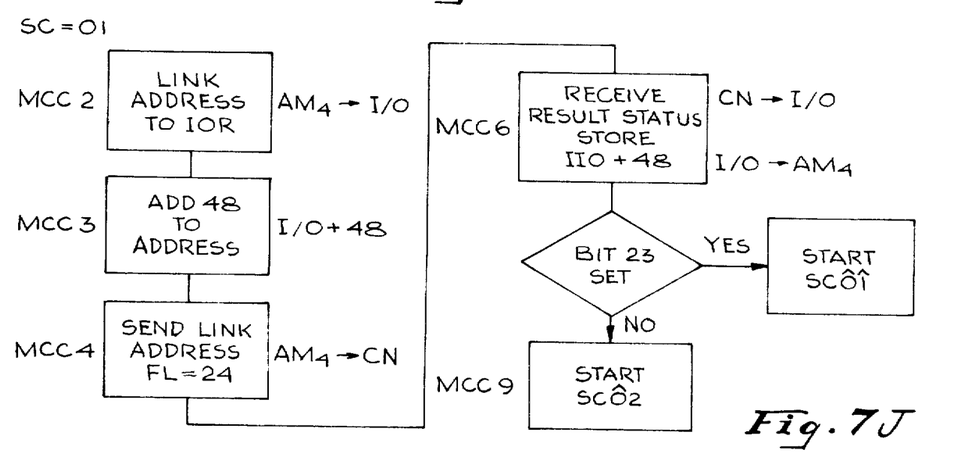

As indicated in FIG. 7H during the swap result descriptor state, the IIO address is incremented to 24 to obtain the starting address of the link address field. During the 8th step of the flow diagram, (FIG. 7I), sequence counter state SC−15, the link address is fetched to the input/output register 21 and stored in scratch pad location $AM_4$. The IIO+24 address is incremented to IIO+48 and stored in the $AM_1$ scratch pad storage area.

The link address stored at $AM_4$ is then used to fetch the result status field from the read descriptor 13 during step 9 (FIG. 7J) of the flow, sequence counter state SC01. The OC bit of the result status field is tested and since it has been set to "0", the read operation is performed by fetching the op code at SC02 (FIG. 7K) and then returning to step 3 of the flow, sequence counter state SC03. Ultimately, if a negative response character is received in response to performance of the read operation, the I/O control will link via the link address of the read descriptor 13 back to the result status field of the write descriptor 11. Thus, after a read operation in FIG. 7H, the poll test would indicate "yes" upon coincidence of positive levels from the READ, POLL and LONR (link on negative response) outputs of the OP REG 19 (FIG. 9) and the receipt of a negative response character from the terminal polled during the previous WRITE operation. After linking back to the write descriptor 11, the beginning address will be taken from the final address field E and will indicate the next character in the poll list to be sent out.

What is claimed is:

1. In a data processing system, means for providing automatic polling of a peripheral in response to digitally coded input/output descriptors comprising:

a system memory for storing a read-from-peripheral digitally coded input/output descriptor and a write-to-peripheral digitally coded input/output descriptor, each including a settable poll indication, said write-to-peripheral descriptor also including a linking address to said read-from-peripheral descriptor, and said read-from-peripheral descriptor also including a linking address to said write-to-peripheral descriptor, said write-to-peripheral descriptor additionally including poll message addresses of a plurality of poll messages stored in said memory, and further including a pointer address pointing to a particular one of said poll message addresses; and input/output control means for controlling the transfer of data between said memory and said peripheral;

said input/output control means including means for fetching said write-to-peripheral descriptor from said memory and in response to the detection of a predetermined setting of the poll indication of the fetched write-to-peripheral descriptor causing the poll message pointed to by the pointer address to be transferred to said peripheral following which the pointer address is modified to point to another poll message;

said input/output control means also including means for automatically fetching said read-from-peripheral descriptor from said memory in response to the linking address of the fetched write-to-peripheral descriptor and for executing the fetched read-from-peripheral descriptor so as to provide for the transfer from said peripheral of a response to the poll message transferred thereto during execution of said write-to-peripheral descriptor;

said input/output control means additionally including means for automatically linking back from said read-from-peripheral descriptor to said write-to-peripheral descriptor using the linking address of said read-from-peripheral descriptor so as to provide for another execution of said write-to-peripheral descriptor, said linking back occurring in response to a predetermined setting of the poll indication of said read-from-peripheral descriptor and the receipt of a first predetermined type of response from said peripheral to the poll message transferred thereto during execution of the immediately preceding write-to-peripheral descriptor.

2. The invention in accordance with claim 1, wherein said input/output control means further includes means for terminating the linking back from said read-from-peripheral descriptor to the write-to-peripheral descriptor in response to the receipt from said peripheral of a second predetermined type of response to the poll message transferred thereto during execution of the immediately preceding write-to-peripheral descriptor.

3. The invention in accordance with claim 1, wherein each of said write-to-peripheral and read-to-peripheral descriptors also includes an "operation complete" indication which permits execution of its respective descriptor only when said "operation complete" indication is set to a predetermined value, and wherein said input/output means also includes means for automatically setting the "operation complete" indication of each of said write-to-peripheral and read-from-peripheral descriptors to said predetermined value following execution of its respective descriptor whenever linking is to occur from the respective descriptor to the other of said descriptors.

* * * * *